(12) United States Patent
Cohen

(10) Patent No.: US 7,450,705 B1
(45) Date of Patent: Nov. 11, 2008

(54) METHOD TO TEST AND COMPARE VOICE TELECONFERENCE SYSTEMS

(75) Inventor: Harvey Spencer Cohen, Middletown, NJ (US)

(73) Assignee: AT&T Corp., New York, NY (US)

( * ) Notice: Subject to any disclaimer, the term of this patent is extended or adjusted under 35 U.S.C. 154(b) by 480 days.

(21) Appl. No.: 11/216,609

(22) Filed: Aug. 31, 2005

(51) Int. Cl.
*H04M 3/42* (2006.01)

(52) U.S. Cl. .................. 379/202.01; 379/1.01; 370/260

(58) Field of Classification Search ................. 370/260, 370/261; 379/67.1, 68.1, 1.01, 1.02, 32.01, 379/202.01; 369/47.1
See application file for complete search history.

(56) References Cited

U.S. PATENT DOCUMENTS

| | | | |
|---|---|---|---|
| 4,316,059 A | | 2/1982 | Toth |
| 5,544,228 A | | 8/1996 | Wagner et al. |
| 5,790,423 A | | 8/1998 | Lau |
| 6,035,046 A | * | 3/2000 | Cheng et al. .................. 381/59 |
| 6,259,691 B1 | | 7/2001 | Naudus |
| 6,671,732 B1 | | 12/2003 | Weiner |
| 6,674,459 B2 | * | 1/2004 | Ben-Shachar et al. .... 348/14.09 |
| 6,675,054 B1 | | 1/2004 | Ruberg |
| 6,772,127 B2 | | 8/2004 | Saunders et al. |
| 7,113,514 B2 | * | 9/2006 | Tahernezhaadi et al. ..... 370/401 |
| 7,280,487 B2 | * | 10/2007 | Goodman .................... 370/252 |
| 2006/0064342 A1 | * | 3/2006 | Frengut et al. ................ 705/10 |

* cited by examiner

*Primary Examiner*—Ahmad F. Matar
*Assistant Examiner*—Antim Shah

(57) ABSTRACT

Systems for testing and comparing audio teleconference quality for one or more voice teleconference systems can include at least two recording devices, a connection to each participant, and a test of the recording qualities. Each participant is connected in an audio teleconference through a transmission system using an audio teleconference bridge. Each participant is recorded as an individual track, wherein the individual tracks are synchronized in order to create a multi-track standard source recording. A second recording device recording the audio teleconference through the audio teleconference bridge and transmission system and forms a second recording. The second recording is tested to evaluate the quality of the audio teleconference.

9 Claims, 3 Drawing Sheets

METHOD TO TEST AND COMPARE VOICE TELECONFERENCE SYSTEMS

SPECIFICATION

1. Field

The present embodiments relate to methods and apparatus for monitoring and testing the quality of teleconferencing systems using a teleconferencing bridge.

2. Background

Telecom customers use many kinds of transmission facilities. In addition to preexisting circuit-switched connections, wireless connections, voice over IP (internet protocol), and international connections using a variety of codecs are currently used. The variety of transmission facilities presents special challenges for teleconferencing bridges to maintain quality and clarity over communication links.

Video and audio teleconferencing technology is moving toward automated services that do not require an operator to manually connect parties to the conferences. Typically, the teleconferencing service provider allocates one or more personal identification numbers (PINs) to subscribers and connects each subscriber to their intended conference based on the PIN entered by the subscriber, through equipment known as a teleconferencing bridge. A conference usually includes a host who organizes or leads the conference, and a number of guests. The host may often have additional privileges beyond those of the guests, such as, for example, being able to add or remove guests from the conference, and may be distinguished from the guests by having a PIN that is different from the PIN or PINs assigned to the guests.

As the number of subscribers to teleconferencing services increase, more new service providers are responding and providing communicating links in a teleconference. These links are difficult to evaluate for voice quality, signal clarity and other factors.

A need exists for a method and apparatus to monitor the various teleconferencing links that apply to a teleconference bridge to determine problems in the communication links, either with the communication to the bridge or from client devices.

Therefore, as the number of users and communication links increases, ISP's struggle to maintain quality.

A need exists for a method or a system that is used to improve quality of communication links using teleconferencing bridges.

The present embodiments meet these needs.

SUMMARY

The present embodiments are directed towards systems and methods for testing and comparing audio teleconference quality for one or more voice teleconference systems. The embodied systems include connection means to connect each participant in an audio teleconference through a transmission system using an audio teleconference bridge. A recording device is used to record output of individual participants in the audio teleconference as individual tracks, synchronize individual tracks, and create a multi-track source recording. The synchronized multi-track source recording can then be stored on a database.

The systems can use a second recording device for recording the audio teleconference through the audio teleconference bridge and transmission system and to form a recording. The systems can include a playback device for playing back the synchronized multi track source recording from the first recording device.

The embodied systems can use a testing means to evaluate the quality of the audio teleconference. The quality can be evaluated by monitoring the second recording for sound quality. Alternatively or in addition to, the quality can be evaluated by using the first recording with a different audio teleconference bridge and transmission system to form a third recording and, then, comparing the third recording to the second recording for sound quality.

BRIEF DESCRIPTION OF THE DRAWINGS

The detailed description will be better understood in conjunction with the accompanying drawings as follows.

Figure 1:
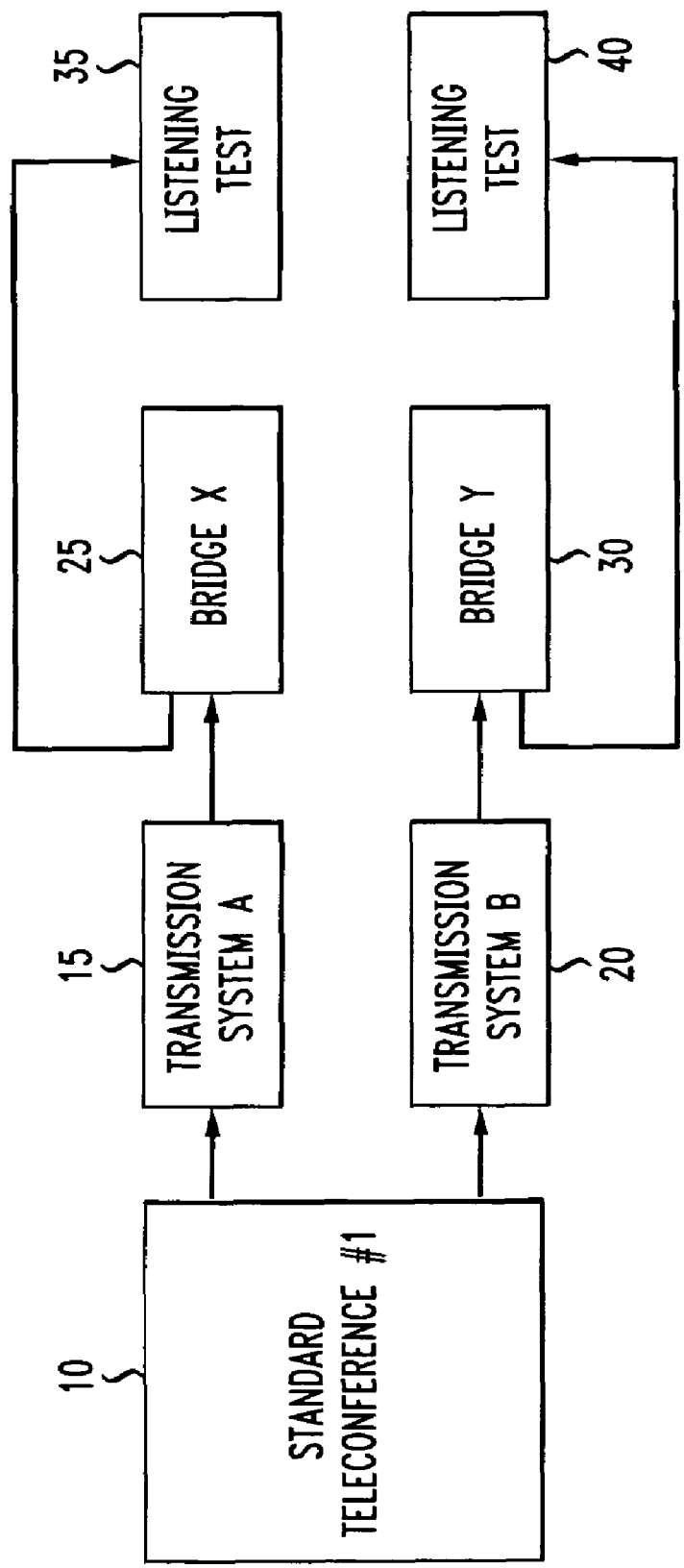
FIG. 1 is an example schematic of a system for recording two teleconferences from the same source.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments, and they can be practiced or carried out in various ways.

The present embodiments present efficient and repeatable systems and methods to evaluate various combinations of transmission facilities and teleconference bridges at the same time. The present embodiments make teleconference bridges and transmission facilities testing practical and repeatable.

The recording devices can utilize software for digitally recording audio from several sources as several discrete tracks, with the tracks time-aligned and the audio time-stamped, implemented on any suitable commercially-available computer or specialized audio recorder.

The present embodiments entail arranging a teleconference to create a first teleconference call to be recorded. The teleconference can be a "real" telephone call, or the teleconference can be arranged solely for the purpose of making a recording for testing purposes.

Embodiments of a system for testing and comparing audio teleconference quality include connection means, a database, a recording device, and a playback device. The connection means allows each participant in an audio teleconference to connect through a transmission system using an audio teleconference bridge. The connection means can be used to monitor the transmitted G.711 circuit-switched channel or capture of the transmitted G.711 packets in a voice over IP connection.

A recording device can be used to record output of individual participants in the audio teleconference as individual tracks. The recording device can be used to synchronize individual tracks, wherein the synchronized individual tracks form a multi-track source recording. The recording device can store the synchronized multi-track standard source recording on a database. The database can store the individual tracks. The database can store descriptors with the individual tracks and the synchronized multi-track source recording. Examples of descriptors include file name, location, size, date of recording, and other such information associated with the recordings or tracks.

The recording device can record the audio teleconference through the audio teleconference bridge and transmission system. One or more recording devices can be used. One or more synchronized multi-track source recordings can be formed.

A playback device is used to play back of the synchronized multi track source recording. Testing means can be used to evaluate the quality the individual tracks and, therefore, the audio teleconference. The testing means can monitor the recordings made after the first recording for sound quality. The testing means can use the initial recording with a different audio teleconference bridge and transmission system to form additional recordings. The additional recordings can be compared to any other created recording in order to identify problems in the sound quality. The comparisons can be performed using an objective measure, such as an algorithm.

With reference to the figures, FIG. 1 is an example schematic of a system for recording two teleconferences from the same source. Two recordings can be made using a teleconference from a single source. The teleconference (10) is recorded using a first transmission system (15). The teleconference (10) is recorded as a first recording (35) for a listening test, wherein the first recording (35) is saved via a first bridge (25). Likewise, the teleconference (10) is recorded using a second transmission system (20). The teleconference (10) is recorded as a second recording (40) for a listening test, wherein the second recording (40) is saved via a second bridge (30).

The first and second recordings (35 and 40) can be used for a listening test. The first and second recordings (35 and 40) can be evaluated by asking a group of people to listen to the recordings or by using a voice recognition system to listen to the recordings for voice clarity. Each of the first or second recordings (35 and 40) can be evaluated by comparing input audio (10) and output audio (35 and 40) by an objective measure such as PESQ (ITU-T Recommendation P.862

The present embodiments provide a manner for evaluation of a single teleconference over different equipment to determine if failures in quality occur based on the teleconference bridge or the transmission system or both. The comparison may not be absolutely exact due to differences in delay of the playback of the recordings. Some transmission systems can have delays in the low tens of milliseconds, while other transmission systems can have delays in the hundreds of milliseconds.

For example, if a first teleconference had a 20 msec legs, a first participant, John, could respond 40 msec after a second participant, Mary, spoke. If a second teleconference had a 200 msec legs, the first participant, John, could not respond until 400 msec after a second participant., Mary, spoke. Accordingly, if standard teleconference was recorded with 20 msec legs and then played back into equipment with 200 msec legs, listeners still would hear John respond just 40 msec (not 400 msec) after Mary spoke. Even with the delay, the present embodiments ensure that the teleconference bridge sees precisely the same conversation each time. For example, if George and Hilda started speaking simultaneously in a standard teleconference, George and Hilda would start speaking simultaneously in every listening test, regardless of the transmission delay. This aspect ensures proper evaluation of teleconference bridges. The evaluation can be based on several standards, wherein the standards are dependent upon characteristics, such number of different participants, quantity of different kinds of teleconferencing equipment, types of various background noises, and multiple meeting structures (such as chaired meetings, or formal presentations).

Figure 2:
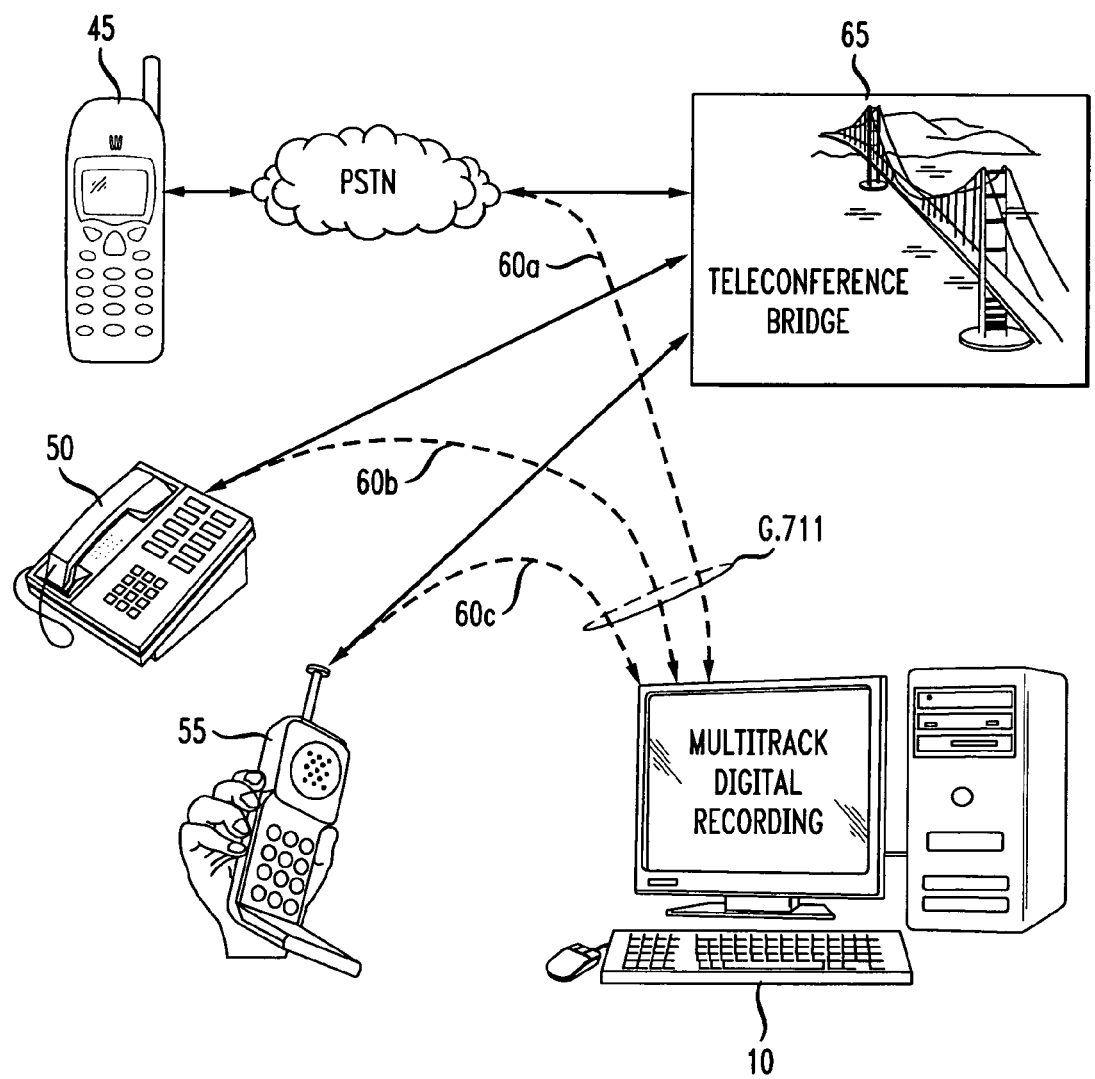
FIG. 2 is an example schematic for capturing the source recording.

FIG. 2 is an example schematic for capturing the source recording. A teleconference is arranged from one or more sources. FIG. 2 depicts the embodiments wherein the teleconference is from three sources (45, 50, and 55). The three sources depicted in FIG. 2 are a cellular phone (45), a land phone (50), and wireless phone (55). The cellular phone (45) transmits through a PSTN 40, which in turn transmits over G.711 circuit-switched transmission facilities. The sources (45, 50, and 55) in the example are transmitting over G.711 circuit-switched transmission facilities (60*a*, 60*b*, and 60*c*). The sources (45, 50, and 55) also transmit to a teleconference bridge (65). The teleconference bridge (65) can be a type in common use for this type for PSTN-based teleconferences. The teleconference bridge (65) can be a simple summing bridge or an N-loudest bridge.

During the teleconference, the three sources (45, 50, and 55) transmitted across the G.711 audio stream are captured from each participant as a track in a source multi-track recording. The individual tracks from the three sources (45, 50, and 55) are then synchronized together creating the multi-track source recording. The source multi-track recording is then stored in the database of the recording device, along with information about the teleconference including (but not limited to) the number of participants, the telephone set used by each participant, the acoustic environment around each participant, the sex of each participant, and the structure of the teleconference (e.g., chaired meeting, presentation with questions and discussion, freeform problem-solving or decision-making, etc.).

One or more tracks can be used to make the multi-track recording. In the example, the audio from the three sources (45, 50, and 55) to the teleconferencing bridge (65) is captured.

Use of multi-tracks permits playback with precise synchronization of the conference legs. The source multi-track recording can be edited to include periods of high interaction and to limit total time for the total recording.

Figure 3:
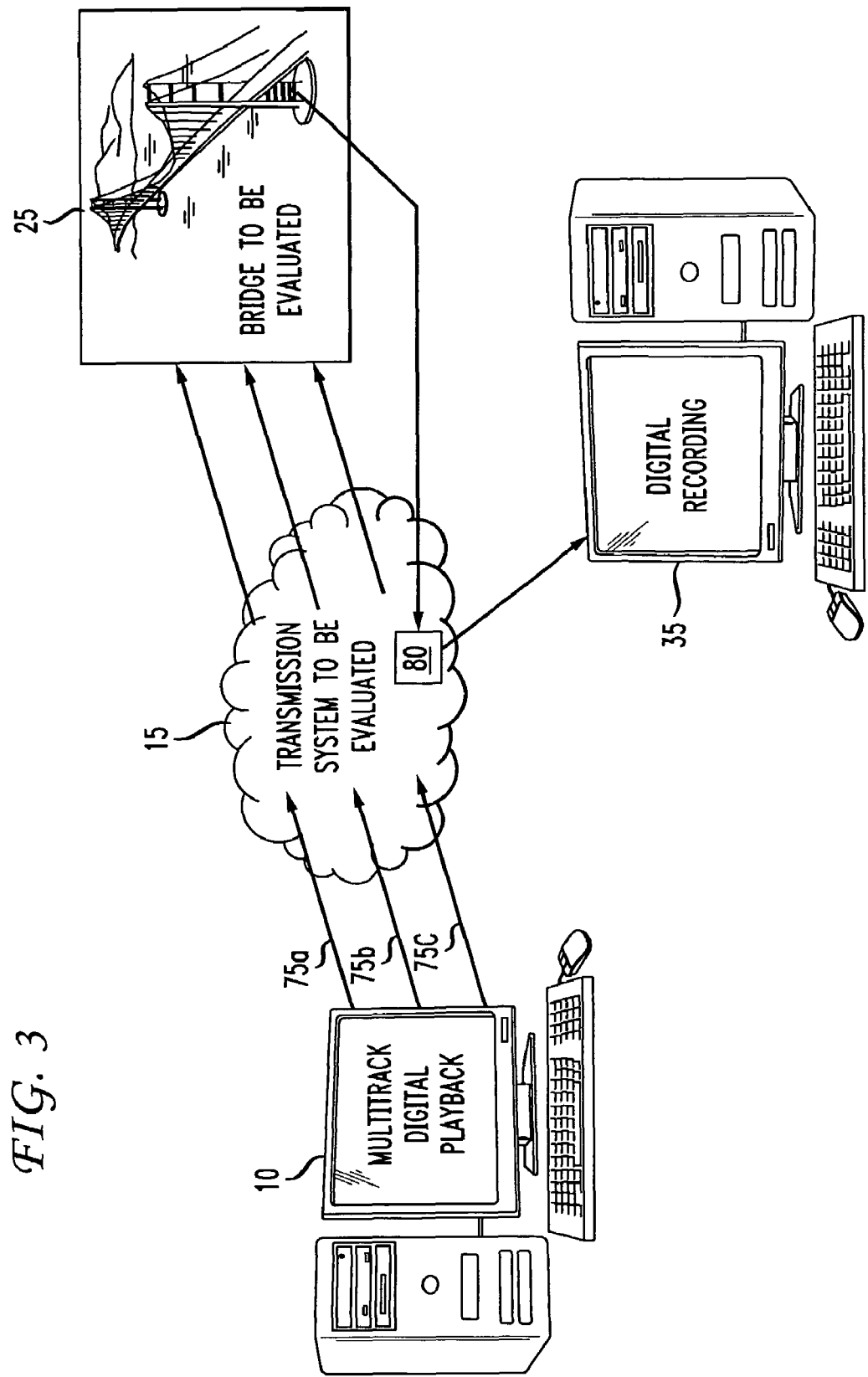
FIG. 3 depicts an example schematic for making the evaluation of the recording.

FIG. 3 depicts an example schematic for making a recording to evaluate a transmission system and teleconference bridge. The multitrack recording becomes the "Standard Teleconference" (10) shown in FIG. 1. The N tracks of the multitrack recording (75*a*, 75*b*, and 75*c*) are played by the recording device as separate inputs to the transmission system under test (15) and the teleconferencing bridge under test (25). The output of the teleconference bridge (25) is played back into the transmission facility (80), and the output audio is recorded (35) as the N+1st leg of the teleconference.

A subjective test of the first listening test recording is fundamentally a listening test. Unlike most listening tests, the present embodiments utilize few (perhaps just one) relatively long recording instead of many short ones.

The present embodiments can be used for numerous scenarios. For example, the present embodiments can be used as a standard listening-test setup, with a group of participants listening through headphones and being prompted for ratings of the recording. For another example, the present embodiments can be used as a telephone interface whereby participants phone in, listen, and give a rating. In yet another example, the present embodiments can be used as a web interface whereby participants listen and rate on their PCs.

While these embodiments have been described with emphasis on the embodiments, it should be understood that within the scope of the appended claims, the embodiments might be practiced other than as specifically described herein.

What is claimed is:

1. A system for testing and comparing audio teleconference quality for at least one voice teleconference system, comprising:

a. connection means to connect each participant in an audio teleconference through a transmission system using an audio teleconference bridge, and to monitor transmitted channels through the transmission system or to capture transmitted packets in a voice over IP connection;

b. a database;

c. at least one first recording device connection to the audio teleconference bridge and the transmission system to:
  i. record output of individual participants in the audio teleconference as individual tracks, forming a first recording;
  ii. synchronize individual tracks to create a multi-track source recording; and
  iii. store the individual tracks and the synchronized multi-track source recording on the database;

d. at least a one second recording device for recording the audio teleconference through the audio teleconference bridge and transmission system and forming at least one second recording;

e. a playback device for playing back of the synchronized multi track source recording of the first recording device; and f. a testing means for evaluating the quality of the individual tracks and the audio teleconference by:
  i. monitoring the at least one second recording for sound quality; and
  ii. using the first recording with a second audio teleconference bridge and transmission system to form a third recording and comparing the third recording to the second recording at the same time comparing the first recording to the second recording for sound quality using an objective measure.

2. The system of claim 1, wherein the database stores individual tracks and the synchronized multi-track source recording.

3. The system of claim 2, wherein the database further comprises descriptors for each individual track.

4. The system of claim 1, wherein the testing means comprises a listening test facility, wherein participants listen to individual tracks under controlled acoustic conditions and enter evaluations.

5. The system of claim 1, wherein the testing means further comprise comparing the individual tracks against the first recording or the second recording using an objective measure.

6. The system of claim 1, wherein the objective measure is an algorithm.

7. The system of claim 1, wherein the testing means comprises monitoring the first recording or the second recording for sound quality using a web interface, wherein participants listen on the web interface and rate the quality of the system.

8. The system of claim 1, wherein the first teleconferencing bridge is an N-loudest bridge or a summing bridge.

9. The system of claim 1, wherein at least two tracks are used to make the multi-track source recording.

* * * * *